W. L. BEACH.
AUTOMOBILE SIGNAL CONTROLLING DEVICE.
APPLICATION FILED DEC. 15, 1919.

1,391,360. Patented Sept. 20, 1921.

Inventor
Walter L. Beach,

UNITED STATES PATENT OFFICE.

WALTER L. BEACH, OF FLINT, MICHIGAN.

AUTOMOBILE-SIGNAL-CONTROLLING DEVICE.

1,391,360.   Specification of Letters Patent.   Patented Sept. 20, 1921.

Application filed December 15, 1919. Serial No. 344,874.

*To all whom it may concern:*

Be it known that I, WALTER L. BEACH, a citizen of the United States of America, residing at Flint, in the county of Genesee and State of Michigan, have invented certain new and useful Improvements in Automobile-Signal-Controlling Devices, of which the following is a specification, reference being had therein to the accompanying drawings.

My invention aims to provide a simple, durable and inexpensive device that may be easily and quickly mounted on the steering column assembly of an automobile or other motor vehicle for controlling the operation of a signal used as an accessory or safety equipment of the automobile, the device being held so that it may be adjusted to a desired position convenient to the chauffeur or driver of an automobile.

My invention further aims to provide a controlling device wherein positive and reliable means are employed for limiting the movement and locking an operating member forming part of the device, and the construction of the device is such that mechanism associated therewith is protected from the elements and does not interfere with the usual equipment of an automobile.

My invention will be hereinafter specifically described and then claimed, and reference will now be had to the drawings, wherein—

Figure 5:
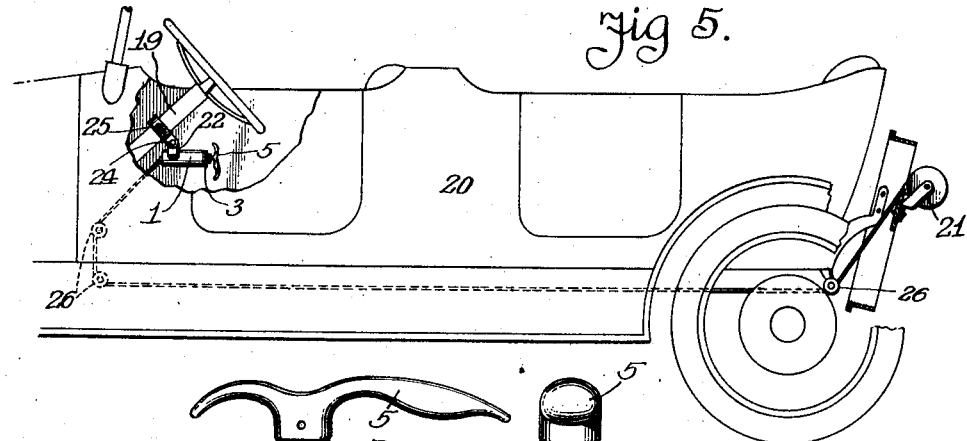
Fig. 5 is a side elevation of the device in connection with the steering column assembly of an automobile, showing an automobile provided with a signal controlled by the device.

The device comprises a cylinder 1 having its lower end open and its upper end interiorly screwthreaded so as to receive a cap 3 having a central or axial opening 2 for a plunger or operating member 4 which is reciprocable within the cap 3. The outer end of the operating member 4 has a handle or hand grip member 5 normally engaging the cap 3 and said operating member is provided with a series of notches 6 adapted to be engaged by a spring pressed detent 7 located within the cap 3, said detent holding the operating member 4 in an adjusted position.

Suitably attached to the inner end of the operating member 4, as at 8, is a flexible member 9 trained under a grooved pulley or sheave 10 journaled in the inner bifurcated end 11 of a slotted and curved stop member 12 carried by the cap 3 and disposed longitudinally of the cylinder 1 between the operating member 4 and the walls of said cylinder.

Figures 1, 2:
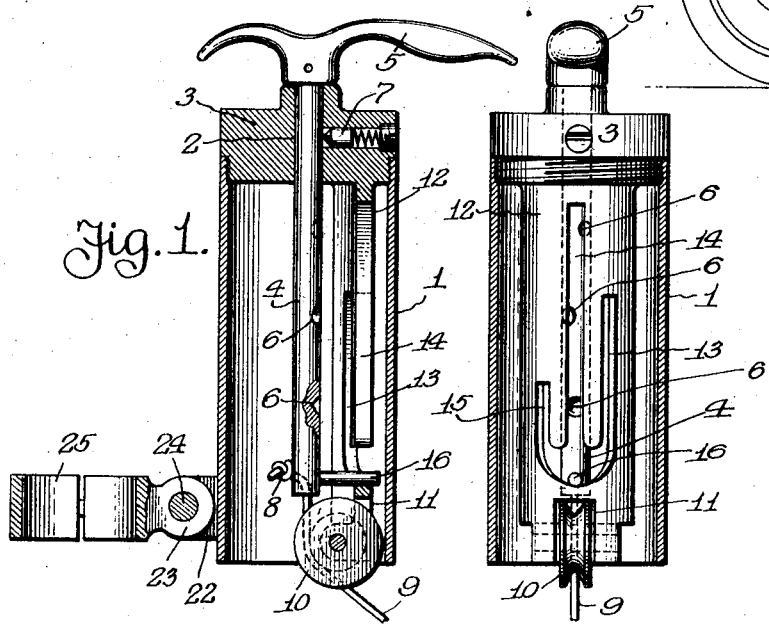
Figure 1 is a vertical sectional view of the controlling device.
Fig. 2 is a vertical transverse sectional view of the device, partly in elevation.
Figure 3:
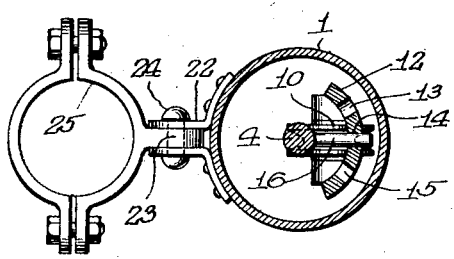
Fig. 3 is a horizontal sectional view of the controlling device.

The stop member 12 is curved on an arc having for its center the operating member 4 and said stop member has longitudinal slots 13, 14 and 15 with said slots varying in length and all of said slots communicating at the inner end of the stop member 12, as best shown in Fig. 2.

Protruding into the slots of the stop member 12 is a radially disposed pin 16 carried by the operating member 4 and outward movement of said operating member is limited by the pin 16 engaging the outer end walls of the slots 13, 14 and 15. With the slots 13, 14 and 15 communicating it is possible to rock or partially rotate the operating member 4 so that its pin 16 will enter a desired slot, and the notches 6 correspond in number to the slots 13, 14 and 15 and are positioned out of alinement so that a notch will always be in position to receive the detent 7, so that the operating member 4 may be locked in a shifted or adjusted position with its pin 16 in either of the stop slots.

Figure 4:
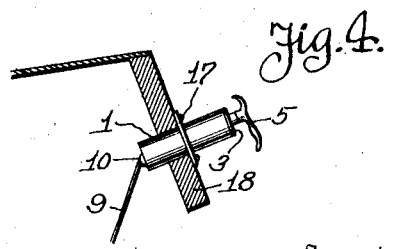
Fig. 4 is a side elevation of the same as supported by the dash or instrument board of an automobile.

As shown in Fig. 4, the cylinder 1 may have a peripheral flange 17 that may be secured to the dash or instrument board 18 of an automobile to maintain the cylinder 1 seated in an opening in the dash or instrument board, and in this instance the cylinder 1 is supported so that the operating member may be easily gripped and actuated.

As shown in Fig. 5 the controlling device is located adjacent the steering column assembly 19 in an automobile 20 having a signal 21 at the rear end thereof, and this particular signal has been made the subject matter of a companion application filed under even date. To support the controlling device relative to the steering column assembly, the inner end of the cylinder 1 is provided with apertured ears 22 adapted to be clamped in engagement with an apertured lug 23 by a rivet 24 or other fastening means, said apertured lug being carried by a two-part clamp 25 suitably secured on the steering column assembly 19. The flexible member 9 attached to the operating member 4 of the controlling device is adapted to be trained over or under suitable guides or sheaves 26, carried by the automobile 20 so that the flexible member may operate the signal 21, and as brought out in my companion application, this signal includes an exhibitor adapted to display three or more signs. The selection of either sign depends on the adjustment of the flexible member 9 and it is in this connection that the stop member 12 has been designed for the three signs of the signal 21, but it is obvious that the stop member 12, as well as the operating member 4 may be constructed so as to take care of more or less signs of a signal.

With the controlling device in proximity to the steering wheel of the automobile, the chauffeur or driver of the automobile can easily grip the handle 5 and shift the operating member 4 in a desired direction so that a desired sign will be displayed by the signal 21 at the rear end of the automobile.

It is thought that the operation and utility of my controlling device will be apparent without further description, and while in the drawing there is illustrated the preferred embodiment of my invention it is to be understood that the structural elements are susceptible to such variations and modifications as fall within the scope of the appended claims.

What I claim is:—

1. A controlling device for signals comprising a rotary and reciprocatory operating member, and a stop member to which a portion of said operating member extends, said stop member being constructively arranged to permit of partial rotation of said operating member and afford a plurality of reciprocable movements of various lengths for said operating member.

2. A controlling device adapted for operating a signal, comprising a cylinder, a reciprocatory and rotary operating member in said cylinder, a flexible signal operating member connected to said rotary operating member, means in said cylinder adapted to hold said rotary operating member in an adjusted position, and additional means in said cylinder to limit a reciprocable movement of said rotary operating member.

3. A controlling device adapted for operating a signal, comprising a cylinder, a reciprocatory and rotary operating member slidable in said cylinder, a flexible member connected to said operating member and adapted for operating a signal, and a stop member supported at one end of said cylinder and extending into said cylinder parallel to said operating member and adapted to limit the movement of said operating member.

4. A controlling device adapted for operating a signal, comprising a cylinder, a cap carried by said cylinder, a reciprocatory and rotary operating member slidable in said cap, a flexible signal operating member connected to said reciprocatory and rotary operating member, a slotted stop member carried by said cap within said cylinder, and a pin carried by said reciprocatory and rotary operating member and extending into said slotted stop member, to define the movement of said reciprocatory and rotary operating member.

5. A controlling device as characterized in claim 4, wherein additional means carried by said cap is adapted for locking said reciprocatory and rotary operating member in an adjusted position.

6. A controlling device adapted for operating a signal, comprising a cylinder, supporting means therefor, a cap carried by said cylinder, an operating member slidable in said cap, a slotted member carried by said cap within said cylinder, a pin carried by said operating member and extending into said slotted member and adapted to have its movement defined by said slotted member, a sheave carried by said slotted member, a flexible signal operating member trained on said sheave and connected to the first mentioned operating member, and means adapted to engage the first mentioned operating member to hold said member in an adjusted position.

In testimony whereof I affix my signature in the presence of two witnesses.

WALTER L. BEACH.

Witnesses:
KARL H. BUTLER,
ANNA M. DORR.